United States Patent [19]
Zahn et al.

[11] 3,709,613
[45] Jan. 9, 1973

[54] METHOD AND APPARATUS FOR DETERMINING PRINTING TIME OF NEGATIVES

[75] Inventors: Wolfgang Zahn; Gunther Friedrich; Volker Weinert, all of Munich, Germany

[73] Assignee: AGFA—Geraert Aktiengesellschaft, Leverkusen, Germany

[22] Filed: Nov. 13, 1970

[21] Appl. No.: 89,357

[30] Foreign Application Priority Data

Nov. 17, 1969 Germany............P 19 57 752.7

[52] U.S. Cl. ..................356/202, 95/10 CT, 355/68
[51] Int. Cl. .............................................G01n 21/22
[58] Field of Search..........................355/67–71; 95/10 CT; 356/202, 206, 222, 226; 250/209, 214 P

[56] References Cited

UNITED STATES PATENTS

| | | | |
|---|---|---|---|
| 3,076,378 | 2/1963 | Biedermann et al | 356/202 X |
| 3,450,016 | 6/1969 | Yamada | 356/222 X |
| 3,511,142 | 5/1970 | Biber | 95/10 CT |
| 3,529,523 | 9/1970 | Haskell | 95/10 CT |
| 3,545,350 | 12/1970 | Gross | 95/10 CT |
| 3,572,944 | 3/1971 | Hanline | 356/206 X |
| 3,575,702 | 4/1971 | Huber | 355/68 X |
| 3,577,039 | 5/1971 | Sanford | 250/209 UX |
| T861,060 | 4/1969 | Moroney | 356/222 X |

Primary Examiner—Ronald L. Wibert
Assistant Examiner—F. L. Evans
Attorney—Michael S. Striker

[57] ABSTRACT

The light transmitted through each negative is measured at N regions to obtain a transparency or density at each of these regions. The measured values are then compared with each other and, on the basis of this comparison, the negatives are grouped to obtain the correct printing time with density correction.

15 Claims, 4 Drawing Figures

METHOD AND APPARATUS FOR DETERMINING PRINTING TIME OF NEGATIVES

BACKGROUND OF THE INVENTION

The invention relates to a method and to an arrangement for determining the exposure with density correction for the printing of negatives.

A known method and apparatus uses a flying spot scanner for obtaining, as the characteristic values, the average value of the transparency and the relative frequency of the average value. This scheme requires that the negative is scanned twice, and is relatively elaborate and expensive.

SUMMARY OF THE INVENTION

An object of the invention is to provide simpler method and apparatus for obtaining the characteristic values of a negative, from which values the printing time is determined.

A further object of the invention is to provide a method and apparatus of the preceding object which produce a greater number of saleable, automatically printed copies.

The method of the invention consists essentially of shining light through each of the negatives in turn, sensing the light transmitted through each negative at N different regions and obtaining for each of these regions a first value related to the light transmitted through the respective region, determining the average of the first values, which average is the characteristic second value, determining a characteristic third value which corresponds to the number of those regions of which their first value is greater than the characteristic second value, determining a characteristic fourth value that corresponds to the number of those regions of which their first value is less than the characteristic second value, determining at least one characteristic fifth value that corresponds at least to one of the two extreme end values of the first values, and comparing these characteristic second, third, fourth and fifth values with empyrical exposure data, with density correction, arranged according to these characteristic values, whereby to determine the correct exposure of the negative for printing with density correction.

The arrangement of the invention consists essentially of a plurality of N photoelectric transducers uniformly spaced to form a grid in a plane and to be shown upon by light transmitted through each negative for measuring at N different regions of the negatives the amount of light transmitted by the negative.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED AMBODIMENTS

Figure 1:
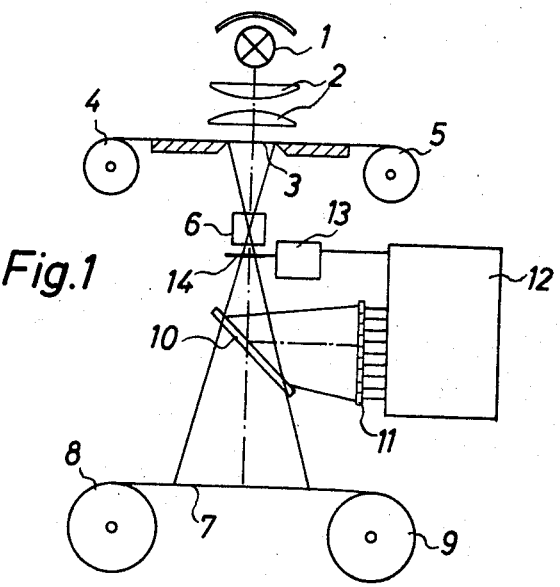
FIG. 1 schematically shows, in side view, a printer employing the arrangement of the invention.

With reference to FIG. 1, the illumination from a printing light source 1 is directed through a double condenser 2 to a negative frame 3. The negative frame, for example, can be part of a long strip which is unwound from a supply roll 4 and wound up on a roll 5. An objective 6 forms an image of the illuminated frame 3 on a strip 7 of light sensitive material, the strip being drawn from a supply roll 8 and wound up on a take-up roll 9.

A semi-transparent mirror 10, inclined at an angle of 45° to the axis of the light path, is arranged at some suitable point below the objective 6, the mirror 10 reflecting a portion of the light transmitted by the negative 3 onto a grid 11 of N phototransducers 15, seen in FIG. 2. The phototransducers, which each have an area of several millimeters, are uniformly distributed over the illuminated area. If the negative format is square, for example, a total of N=49 phototransducers gives an excellent indication of the transparency of the negative frame and of the extreme values of this transparency. A computer 12, which processes the signals from the phototransducers, is connected to the outputs of the transducers 15. The computer controls an electromagnet 13, which operates a shutter 14 to control the printing time, the shutter being closed when the computer sends a signal to the electromagnet 13.

Figure 2:
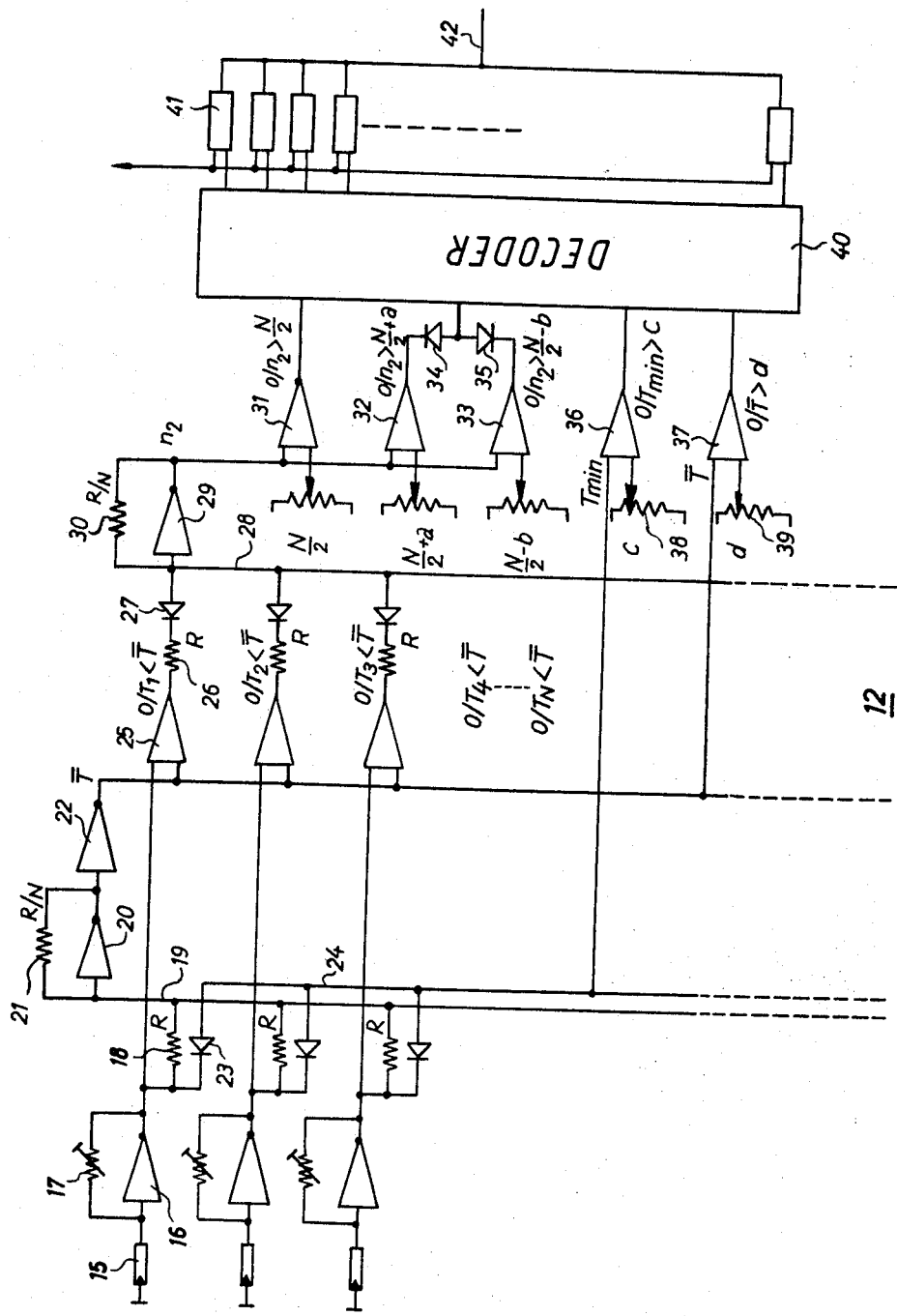
FIG. 2 is a schematic diagram of the computer for evaluating each negative.

FIG. 2 shows the circuit diagram of the computer 12. Each of the phototransducers 15 comprises an individual operational amplifier 16, the input and output of which are connected together by an adjustable resistor 17 for varying the sensitivity of the amplifier. These operational amplifiers act as impedance transformers having low impedance outputs at which appear the signals corresponding to a plurality of N first transparency values at N regions of the negative. Of course, these N first values ($T_1 \ldots T_i \ldots T_N$) will include two extreme values $T_{min}$ and $T_{max}$. The outputs of the amplifiers 16 are connected with first means 19–22. The line 19 connects all of the amplifiers 16, which latter are identical, to the input of a common summing amplifier 20, the input and output of which are connected by a resistor 21. The output of the summing amplifier 20 is connected to an inverting amplifier 22, the output of which corresponds to the average value $\overline{T}$ of the transparency of the negative $\overline{T}$ is referred to herein as a "second value".

The outputs of the operational amplifiers 16 are connected by respective diodes 23 to a common conductor 24. In consequence of the blocking action of the diodes, the voltage on the line 24 corresponds to the smallest of the individual outputs of the amplifiers 16. The outputs of the amplifiers 16 are also connected to one input of respective comparator amplifiers 25. The other input of these comparator amplifiers is connected to the output of the inverting amplifier 22, enabling the amplifiers 25 to determine whether each of the signals corresponding to a respective one of the N regions is above or below the signal corresponding to the average value $\overline{T}$ of the negative transparency. Depending on the result of the comparison, there is either a signal 1 or a signal O across the resistor 26 and diode 27. The O signals each of which corresponds to a region below the average value $\overline{T}$ appear on the line 28 and are added up by the summing amplifier 29, which enables determination of the number $N_2$ of regions whose respective first value $T_i$ lies in a first range between the extreme value $T_{min}$ and $\overline{T}$, $\overline{T}$ being the average of said first values $T_1 \ldots T_i \ldots T_N$). A resistor 30 connects together the input and output of the common summing amplifier 29. Thus, components 25–30 form second means whose purpose it is to determine the number $n_2$.

The output of the summing amplifier 29 is connected to one input of three comparator amplifiers 31, 32, and 33. The other inputs of these comparator amplifiers are connected to respective voltages that correspond to predetermined fixed, limiting values, with which latter the number $N_2$ of the regions that are below the average can be compared. For example, at the input of third means comprising comparator amplifier 31 it is determined whether the number $N_2$ lies within a second range between O and N/2. In the comparator amplifier 32 the comparison is with $(N/2) + a$, and in the comparator amplifier 33 the comparison is with $(N/2) - b$. The constants a and b are experimentally determined and approximately equal N/10. Since the comparator amplifier 32 cannot deliver an O signal when $N_2$ is smaller than N/2, and since the amplifier 33 cannot deliver an O signal when $N_2$ is greater than N/2, the outputs of these two amplifiers can be connected by diodes 34 and 35 of suitable polarity to a common output.

The output of the comparator amplifier 36 corresponds to the result of a determination whether $T_{min}$ lies in a fourth range T>c, the limiting value c being obtained from the resistor 38. The output of the fourth means comprising comparator amplifier 37 corresponds to the result of a determination whether the average transparency $\overline{T}$ obtained from the output of the inverting amplifier 22 lies within the third range d being a preselected arbitrary value T=d, obtained from the resistor 39. The constant c corresponds approximately to the average transparency of the standard negative, and the value of the constant d is approximately of the order of the minimum transparency with an underexposed negative. In accordance with the invention, a single value corresponding only to the minimum or to the maximum transparency (or density, as will be later explained) of the N regions can be used.

Depending on the results of the comparisons, 1 or O signals are at the outputs of the comparator amplifiers 31, 32/33, 36 and 37. The different possible signal combinations determine 16 different groups. The outputs of these comparator amplifiers are connected to a conventional decoder 40, which, by means of gates, makes a stepwise comparison of the signals from these amplifiers and separates them into groups. The result of this separation can, for example, give rise to a 1 signal on one of the 16 outputs of the decoder, corresponding to the 16 groups with one of which a negative will be classed.

A small box 41, containing a resistor or a pair of resistors, is associated with each of the outputs of the decoder. One terminal of these resistors is connected to a common voltage source, and the other terminal is connected by a switching arrangement, controlled by the O signal, to the output 42, which is connected to the control arrangement of the (non-illustrated) printer. The one or two resistors in the boxes 41 therefore influence the amount of correction for density—in other words, the degree of departure from the reciprocity law. U.S. Pat. No. 3,426,357 describes a device that provides, in dependence on the value of two resistors, any desired amount of correction for departure from reciprocity. The pair of resistors in each of the boxes 41 correspond in their function to the resistors 22 and 26 in FIG. 1 of the aforesaid U.S. patent. The output of the amplifier 22, of the present invention, can be used directly as the light dependent signal for the device shown in FIG. 1 of the patent.

The signals from the phototransducers 15 correspond to the transparency of the negative at N different regions. By altering the circuit and using components having a logarithmic characteristic, there can be obtained signals that correspond to the density of the negative. These density signals are processed in the same manner as those of the transparency signals.

Figure 3:
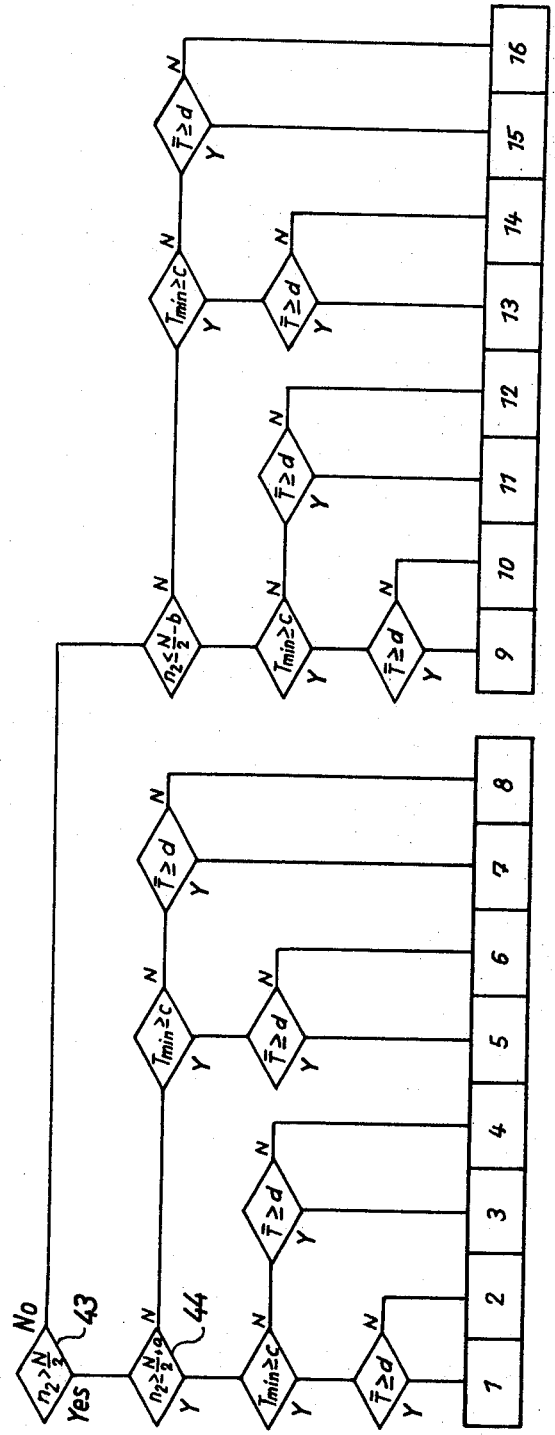
FIG. 3 diagrammatically shows the manner in which the negatives are sorted into groups.

FIG. 3 schematically shows how the negatives are separated into groups corresponding to the characteristic values obtained. In the first comparison stage 43 the number $n_2$ is compared with N/2; depending on the outcome of this comparison, $n_2$ is thereupon compared with either $(N/2) + a$ or $(N/2) - b$, and, independent of this result, the minimum transparency of all subgroups is compared with a constant c. The value $\overline{T}$ is compared with a further constant d in correspondence to the values given in FIG. 3. The remaining groups are also more finely subdivided, so that altogether there are 16 groups of negatives. In accordance with the invention, there can be more or less than 16 groups. Any number of additional groups can be formed by more finely subdividing the limiting values. The number of groups can also be reduced by combining several groups into one, all of the negatives of a combination group then receiving the same exposure during printing.

For each group of negatives thus obtained, there is determined an average correction, which is based upon experience. The manner in which a correction value is preset for a particular group of negatives does not form part of the invention, and is best accomplished empirically. The values of the one or two resistors in the boxes 41 are chosen to correspond to the correction empirically determined so that these resistors cause the correct printing time for each negative group.

Figure 4:
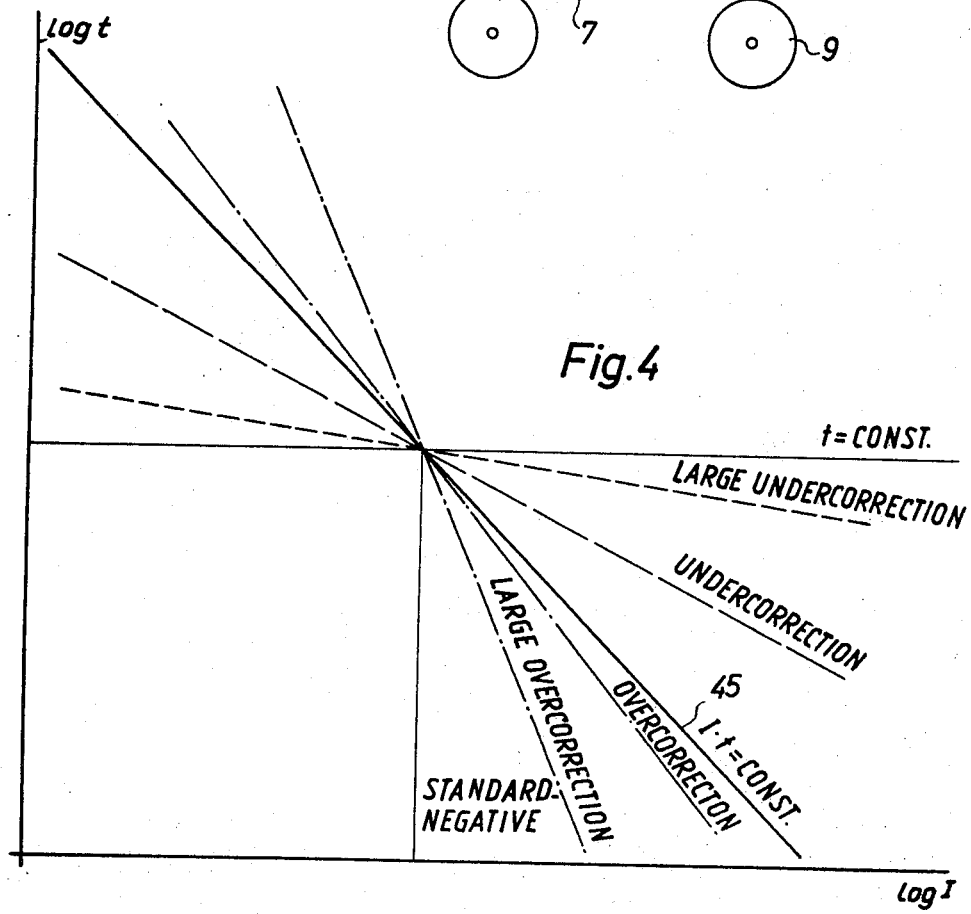
FIG. 4 is a graph showing the dependence of printing time on the density correction.

The family of log I/log $t$ curves in FIG. 4 shows the relationship between the measured light intensity of the printer and the required printing time with the required amount of correction as parameter.

The straight line 45, sloping at a 45° angle, represents the equation I.$t$=const. When the printing time is determined from this line, the total irradiation remains constant. However, a better print is often obtained by slightly overcorrecting, by undercorrecting, by greatly undercorrecting, or even with constant printing time. Selection of a particular I versus $t$ operating curve corresponds to activation of a respective one of boxes 41 at the output of decoder 40.

In the embodiment described, the characteristic values are the minimum transparency $T_{min}$, the average transparency $\overline{T}$, and the number $n_2$ of the regions above or below the average, in the illustrated embodiment $n_2$ representing the number of regions below the average. Useful results can also be obtained by substituting for the transparency, the density, the reciprocal of the transparency, the reciprocal of the density, or the difference between the extreme values of the transparency or density. These values can be obtained automatically in the same way by means of a circuit. Since the principles that are applied are the same in all cases, it is not necessary to describe these additional embodiments further. In accordance with the invention, a value corresponding to the minimum or maximum transparency (or density) or two values corresponding respectively to the minimum and maximum transparency (or density) can be used in conjunction with a value corresponding to the difference between the minimum and maximum transparency (or density).

The density correction values thus obtained can be used with both black and white color printers. With color printers, the phototransducers must be equally responsive to all three of the primary colors, and off color casts must be accounted for, as explained, for example, in the copending U.S. patent application Ser. No. 21,670.

The method of the invention enables the completely automatic determination of density corrections for a printer, the output of saleable prints being appreciatably better than with manually obtained density corrections. The method of the invention is particularly advantageous for high speed printers that operate too fast for density corrections made by hand.

The number of regions N of 49 is only given by way of example. It may be varied between 15 and 300 according to further considerations without leaving the scope of the present invention.

It will be understood that each of the elements described above, or two or more together, may also find a useful application in other types of circuits differing from the types described above.

While the invention has been illustrated and described as embodied in a method and apparatus for determining printing times of negatives, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of automatically sorting negatives into a plurality of exposure-correction classification groups preliminary to the setting of exposure corrections for such negatives, comprising the first step of passing light through each of the negatives; the second step of sensing a plurality of first values corresponding to the light transmitted through each of N regions of each of the negatives, said plurality of first values including two extreme values; the third step of determining for each negative a second value corresponding to the average with respect to the total number of regions N of said first values; the fourth step of determining for each negative the number $n_2$ of regions whose respective first value lies within a first range intermediate said second value and a preselected one of said extreme values; the fifth step of determining for each negative whether said number $n_2$ lies within a preselected second range intermediate O and N; the sixth step of determining for each negative whether said second value lies within a preselected third range; the seventh step of establishing a plurality of classification groups respectively intended to contain negatives whose second value lies within said preselected third range, whose second value lies outside said preselected third range, whose number $n_2$ lies within said preselected second range, whose number $n_2$ lies outside said preselected second range; and the eighth step of assigning negatives to appropriate respective groups on the basis of the determinations made in said first to seventh steps.

2. The method of claim 1, wherein said first values are transparency values.

3. The method of claim 1, wherein said second range is between N/2 and N.

4. The method of claim 1, wherein said sixth step comprises determining whether said second value is greater than or equal to a preselected arbitrary value $d$.

5. The method of claim 1, said extreme values being first and second extreme values; and further comprising the eighth step of determining for each negative whether said first extreme value lies within a preselected fourth range, and wherein said seventh step comprises establishing classification groups respectively intended to contain negatives whose first extreme value lies within said fourth range and whose first extreme value lies outside said fourth range.

6. The method of claim 5, wherein said first extreme value is the lower of said extreme values, and wherein said eighth step comprises determining whether said first extreme value is greater than or equal to a preselected arbitrary value $c$.

7. The method of claim 6, wherein said seventh step is performed prior to said sixth step.

8. The method of claim 1, wherein said fifth step comprises determining whether said second value lies within the range between $(N/2) + a$ and N, where a is a preselected arbitrary constant.

9. The method of claim 1, wherein said fifth step comprises determining whether said second value lies within the range between O and $(N/2) - b$, where $b$ is a preselected arbitrary constant.

10. An arrangement for automatically sorting negatives into a plurality of exposure-correction classification groups preliminary to the setting of exposure corrections for such negatives, comprising N photoelectric transducer means arranged in grid formation for determining a plurality of first values corresponding to the light transmitted through each of N regions of a photographic negative, said plurality of first values including two extreme values; first means for determining a second value corresponding to the average of said first values; second means for determining the number $n_2$ of regions whose respective first value lies within a first range intermediate said second value and a preselected one of said extreme values; third means for determining whether said number $n_2$ lies within a preselected second range intermediate O and N; fourth means for determining whether said second value lies within a preselected third range; and decoder means for automatically assigning negatives to appropriate classification groups respectively intended to contain negatives whose second value lies within said preselected third range, whose second value lies outside said preselected third range, whose number $n_2$ lies within said preselected second range, and whose number $n_2$ lies outside said preselected second range.

11. An arrangement as defined in claim 10 wherein said transducer means comprise operational amplifier means for providing amplified electrical signals corresponding to said first values.

12. An arrangement as defined in claim 10, said transducer means having respective outputs at which are produced electrical signals respectively corresponding to said first values, and wherein said first means comprises summing amplifier means having an input connected with said outputs of said transducer means.

13. An arrangement as defined in claim 10, said transducer means having output means at which are produced electrical signals respectively corresponding to said first values, and said first means having output means at which is produced an electrical signal corresponding to said second value, and wherein said second means comprises a plurality of comparator means each including input means comprising a first input connected with said output means of said first means and a second input connected with a respective output means of said transducer means, each of said purality of comparator means having output means at which is produced an electrical signal indicative of whether said second value is greater than the respective one of said first values, said second means further comprising summing amplifier means having an input connected with the output means of said comparator means and having an output at which is produced an electrical signal corresponding to the sum of the signals at said output means of said comparator means, and thereby corresponding to the number $n_2$ of regions whose respective first value is less than said second value.

14. An arrangement as defined in claim 10, said second means having an output at which is produced an electrical signal corresponding to said second value, and wherein said third means comprises comparator means having a first input connected with said output of said second means and a second input connected with a reference source and furnished with an electrical input signal corresponding to a limit value of said second range.

15. An arrangement as defined in claim 10, said second means having an output at which is produced an electrical signal corresponding to said second value, and wherein said fourth means comprises comparator means having a first input connected with said output of said second means and a second input connected with a reference source and furnished with an electrical input signal corresponding to a preselected arbitrary value.

* * * * *